United States Patent
Cerda et al.

(10) Patent No.: US 12,428,734 B2
(45) Date of Patent: Sep. 30, 2025

(54) METHOD FOR MANUFACTURING A FIRE-RESISTANT PART OF AN AIR CONDITIONING SYSTEM AND PART PRODUCED BY SUCH A METHOD

(71) Applicant: LIEBHERR-AEROSPACE TOULOUSE SAS, Toulouse (FR)

(72) Inventors: Hélène Cerda, Toulouse (FR); Jérôme Rocchi, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 630 days.

(21) Appl. No.: 17/763,833

(22) PCT Filed: Sep. 25, 2020

(86) PCT No.: PCT/FR2020/051669
§ 371 (c)(1),
(2) Date: Mar. 25, 2022

(87) PCT Pub. No.: WO2021/058916
PCT Pub. Date: Apr. 1, 2021

(65) Prior Publication Data
US 2022/0372628 A1 Nov. 24, 2022

(30) Foreign Application Priority Data
Sep. 27, 2019 (FR) ....................... 1910750

(51) Int. Cl.
*C23C 28/04* (2006.01)
*B61D 27/00* (2006.01)
(Continued)

(52) U.S. Cl.
CPC ............ *C23C 28/042* (2013.01); *C23C 4/134* (2016.01); *C25D 11/026* (2013.01);
(Continued)

(58) Field of Classification Search
CPC ........... C23C 28/042; C23C 4/02; C23C 4/11; C23C 4/12; C23C 24/04; C23C 24/08;
(Continued)

(56) References Cited

U.S. PATENT DOCUMENTS

2006/0013986 A1 1/2006 Dolan
2017/0114471 A1* 4/2017 Rice ...................... F02M 26/74

FOREIGN PATENT DOCUMENTS

CN 101306418 6/2012
CN 107815196 A * 3/2018 ............... B05D 5/00
(Continued)

OTHER PUBLICATIONS

Science Learning, "Plasma spray coating" (Year: 2014).*
(Continued)

*Primary Examiner* — Danielle M. Carda
(74) *Attorney, Agent, or Firm* — CRGO Global; Steven M. Greenberg

(57) ABSTRACT

Method for manufacturing a fire-resistant part of an air conditioning system for an air or rail transport vehicle, characterized in that it includes at least the following steps: a step of obtaining a part including at least one aluminum alloy surface portion, and a step of treating the aluminum alloy surface portion by use of micro-arc oxidation in order to produce a ceramic coating on the surface portion.

9 Claims, 2 Drawing Sheets

(51) Int. Cl.
*B64D 13/06* (2006.01)
*C23C 4/134* (2016.01)
*C25D 11/02* (2006.01)
*F16K 25/00* (2006.01)

(52) U.S. Cl.
CPC ............ *F16K 25/005* (2013.01); *B61D 27/00* (2013.01); *B64D 13/06* (2013.01)

(58) Field of Classification Search
CPC ....... C23C 28/04; C23C 4/134; C25D 11/026; C25D 11/16; C25D 11/06; C25D 11/18; C25D 11/024; F16K 25/005; B61D 27/00; B64D 13/06
USPC ........................................................ 148/277
See application file for complete search history.

(56) References Cited

FOREIGN PATENT DOCUMENTS

| CN | 107815196 | 9/2019 | | |
|---|---|---|---|---|
| WO | 97/05302 | 2/1997 | | |
| WO | WO-9705302 A1 | * 2/1997 | ............. | C25D 11/18 |
| WO | WO-2012052532 A1 | * 4/2012 | ........... | C25D 11/026 |

OTHER PUBLICATIONS

WO9705302A1 Translation (Year: 1997).*
International Search Report for PCT/FR2020/051669 mailed Jan. 29, 2021, 6 pages.
Written Opinion of the ISA for PCT/FR2020/051669 mailed Jan. 29, 2021, 7 pages.
Curran et al., "The thermal conductivity of plasma electrolytic coatings on aluminum and magnesium", Surface and Coatings Technology, vol. 199, No. 2-3, Sep. 22, 2005, pp. 177-183.
Yerokhin et al., "Oxide ceramic coatings on aluminum alloys produced by a pulsed bipolar plasma electrolytic oxidation process", Surface and Coatings Technology, vol. 199, No. 2-3, Sep. 22, 2005, pp. 150-157.

* cited by examiner

[Fig. 1]
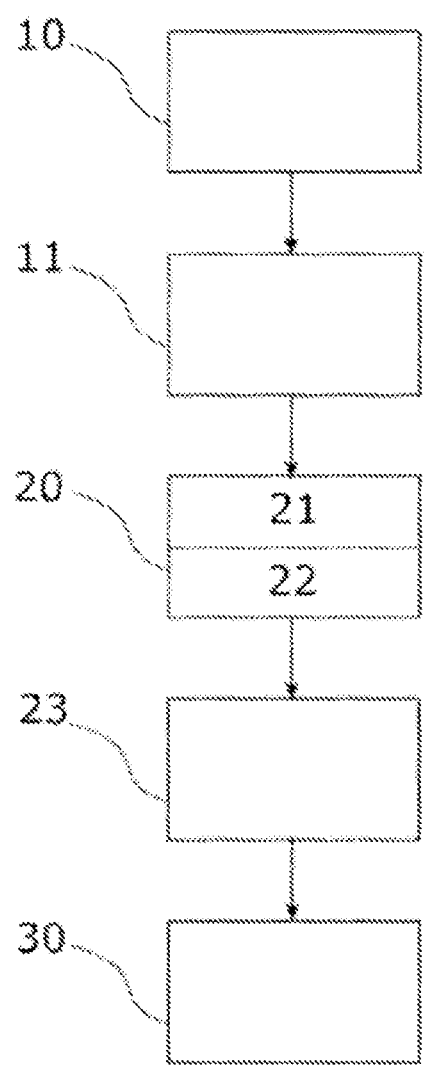

[Fig. 2]
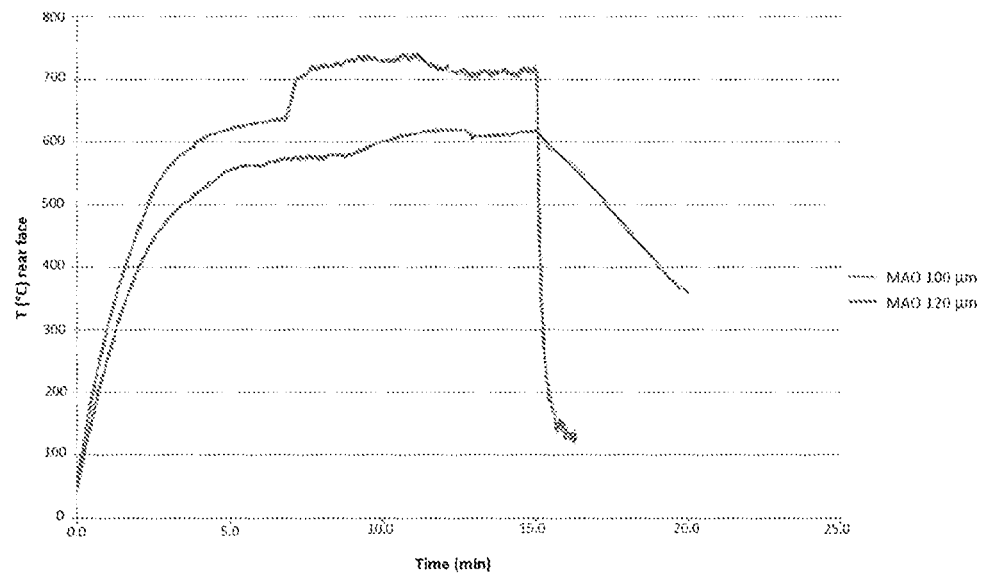
[Fig. 3]
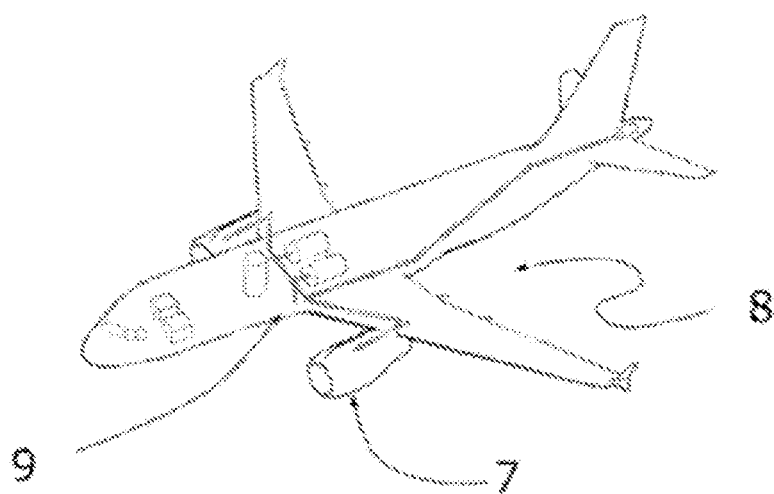

METHOD FOR MANUFACTURING A FIRE-RESISTANT PART OF AN AIR CONDITIONING SYSTEM AND PART PRODUCED BY SUCH A METHOD

This application is the U.S. national phase of International Application No. PCT/FR2020/051669 filed Sep. 25, 2020 which designated the U.S. and claims priority to FR FR1910750 filed Sep. 27, 2019, the entire contents of each of which are hereby incorporated by reference.

TECHNICAL FIELD OF THE INVENTION

The invention relates to a method for manufacturing a fire-resistant part of an air conditioning system intended for use in an air or rail transport vehicle. The invention also relates to a part obtained by the method according to the invention.

TECHNOLOGICAL BACKGROUND

In the field of aeronautics, many parts are subjected to severe mechanical stresses and/or demanding environments, particularly in regard to extreme temperatures. Thus, the parts installed in an engine environment, that is to say, in the engine nacelle or immediately adjacent to the engine, or on the air bleed hoses, and more specifically, the surfaces of these parts are directly impacted.

The parts used in the aeronautics field, and particularly in a high-temperature environment, are generally designed using stainless steel to give them corrosion and wear resistance. For example, when a valve is made with another material, such as aluminum, for reasons such as lightness or intended use in a low-temperature environment, it is protected by a steel plate, giving it properties similar to those of a valve made using stainless steel.

Furthermore, in order to protect the surface of metal alloy parts at high temperatures and in the presence of flames, it would be possible to apply refractory paints or intumescent paints.

However, these treatments have several drawbacks. For example, refractory paints contain ceramic fillers (alumina, zirconia or silica) allowing it to withstand temperatures up to 1,700° C. However, given that the fillers used in these paints are nanoparticles and that the paints use solvents often covered by the REACH regulation, these products are considered to be pollutants and therefore present risks for the environment, health, and safety.

Another drawback lies in the fact that there may be incorrect or insufficient adhesion of the paint to the surface of the valve, which may lead to the erosion of the paint, in turn eliminating any protection of the treated surface.

In addition, intumescent paints can be used on steel to form a thin, hard and smooth film that, when exposed to temperatures of around 400° C., expands to form a heat insulating foam layer. This heat insulating foam layer does not provide insulation against fire or resistance to flames. Due to its low thermal conductivity, the rise in temperature of the metal structures is delayed. In order to protect the part, it is necessary to apply an anti-corrosion protection primer, an intumescent paint and a finish, which results in an increase in the thickness of the coating, between 250 micrometers and just a few millimeters.

As such, the purpose of the invention is to remedy the drawbacks of the prior art by proposing a method for manufacturing a part that is flame-resistant and which provides insulation from the heat given off by a flame.

AIMS OF THE INVENTION

The invention aims to provide a method for manufacturing a fire-resistant part.

The invention also aims to provide a fire-resistant part of an air conditioning system for an air or rail transport vehicle, which overcomes at least some of the drawbacks of known parts.

The invention also aims to provide, in at least one embodiment, a corrosion-resistant part of an air conditioning system of an air or rail transport vehicle.

The invention also aims to provide, in at least one embodiment, an erosion-resistant part of an air conditioning system of an air or rail transport vehicle.

The invention also aims to provide, in at least one embodiment, a wear-resistant part of an air conditioning system of an air or rail transport vehicle.

The invention also aims to provide an air conditioning system for an air or rail transport vehicle equipped with a part according to the invention.

The invention aims in particular to provide such an air conditioning system for an air or rail transport vehicle that has a lower on-board mass than for known systems.

Finally, the invention aims to provide a transport vehicle, in particular an air transport vehicle, equipped with an air conditioning system according to the invention.

DISCLOSURE OF THE INVENTION

To achieve this, the invention relates to a method for manufacturing a fire-resistant part of an air conditioning system for an air or rail transport vehicle.

A method according to the invention is characterized in that it comprises at least the following steps:
- a step of obtaining a part comprising at least one aluminum alloy surface portion, and
- a step of treating said aluminum alloy surface portion using Micro-Arc Oxidation (MAO) in order to obtain a ceramic coating on said surface portion.

The expression "fire-resistant" is understood to mean that a material may present thermal conductivity with a surface area of 1 $dm^2$ of less than 10 Watts per meter-Kelvin (W/m/K), and/or that the material to which a flame is applied at 1,200° C. for a period of at least 5 minutes, or preferably a period of between 5 and 15 minutes, shows no sign of deformation or deterioration after exposure to the flame. Also, a fire-resistant material does not significantly conduct heat, and allows for an insulating barrier to be formed against the fire.

The manufacturing method according to the invention allows for a fire-resistant part of an air conditioning system to be obtained. The method according to the invention goes against the techniques commonly implemented today to obtain a fire-resistant part, which typically consist in opting for stainless steel or in using specific paints.

The inventors have overcome the technical prejudice according to which an aluminum alloy part cannot be deemed fire-resistant by merely providing to treat the aluminum alloy surface portion (which may correspond to the entire part or only a section of the part) through a micro-arc oxidation treatment step for this portion.

More particularly, the aluminum alloy part may for example be a valve formed by a valve body intended to be fitted into an air duct in the air conditioning system combined with an obturator element enabling the regulation of the air flow in the duct.

For example, the valve body and obturator element assembly can be formed entirely from an aluminum alloy. According to one variant, only the obturator element may be formed using an aluminum alloy.

According to the invention, said part comprises an aluminum alloy surface portion coated via micro-arc oxidation with heat conductivity below 10 W/m/K, preferably between 0.5 and 5 W/m/K.

Implementing a micro-arc oxidation method is a solution making it possible to obtain equipment combining characteristics that are not typically compatible, such as fire-resistance, high corrosion resistance, resistance to erosion and wear, and low impact on fatigue properties.

The use of micro-arc oxidation is particularly advantageous in that it is less polluting and less costly than the solutions of the prior art using stainless steel. Using a micro-arc oxidation method will enable the parts made with stainless steel, which is a heavy material, to be replaced with an aluminum alloy, which is appreciated for its lightness and its low cost.

Said manufacturing method comprises a step of obtaining a part comprising at least one aluminum alloy surface portion. The obtaining step consists in having (or in manufacturing) a part comprising at least one aluminum alloy surface portion.

It is possible that the treatment is only desired for a portion of said part. Therefore, it is advisable to isolate or protect the untreated section by masking the section that is not to be treated, in order to seal it against the electrolyte.

In addition, said manufacturing method comprises a step of treating said aluminum alloy surface portion with micro-arc oxidation, in order to obtain a ceramic coating on said surface portion.

Micro-arc oxidation applied over an aluminum alloy surface makes it possible to obtain a layer of oxides, of the order of a few hundred micrometers, providing good properties of hardness, wear-, corrosion-, and fire-resistance. Thus, the method makes it possible to obtain a material capable of resisting deformation and of providing insulation from the heat given off by a flame when subjected to extreme conditions, such as exposure to a flame at more than 1,000° C.

Advantageously, and according to the invention, this step of treating said aluminum alloy surface portion comprises at least the following steps:
  a step of immersing said aluminum alloy surface portion in an electrolytic bath composed of an aqueous solution, comprising sodium salts,
  a step of applying a pulsed bipolar current at a current density passing through said aluminum alloy surface portion of between 20 A/dm$^2$ and 60 A/dm$^2$ for a period of more than 20 minutes, preferably between 30 minutes and 90 minutes.

According to this variant, said treatment step comprises a first step of immersing said aluminum alloy surface portion in an electrolytic bath composed of an aqueous solution, comprising sodium salts (silicates, aluminates, zirconates, titanates, etc.) the nature of which results in, during the micro-arc oxidation method, the formation of semi-crystalline oxides allowing the corrosion-, wear- and fire-resistance properties of the part to be improved. The immersion step consists in bringing into contact an oxidizable surface portion, referred to as a substrate, such as aluminum alloy.

Micro-arc oxidation consists in imposing a difference in potential between the substrate formed from said aluminum alloy surface portion and a counter-electrode that has also been immersed in the electrolytic bath.

For example, the electrolytic bath comprises sodium silicates ($Na_2SiO_3$) present in a concentration at between 5 and 25 g/L and potassium hydroxide (KOH) present in a concentration between 1 and 10 g/L. The pH of the electrolytic bath is basic, and between 11 and 14, and the temperature of the electrolytic bath is around 20° C. with a variation of ±10° C.

A second step of applying a pulsed bipolar current enables the formation of the ceramic coating to provide protection against fire, wear and corrosion. The applied current is pulsed bipolar so that said part alternately plays the role of cathode and anode.

The step of applying a pulsed bipolar current allows a coating to be formed on the aluminum alloy surface. From the initial seconds of application, a superficial insulating oxide layer forms on the surface of the aluminum alloy substrate. The imposed energy causes the dielectric breakdown of this layer. The voltage at which this phenomenon occurs is referred to as the breakdown voltage. The resulting sparks allow the oxidation process to continue. This phenomenon results in the appearance of discharges, which appear to move over the surface of the part being treated. The oxide layer then grows relatively uniformly over the entire surface of the treated portion. During the treatment, the sparks become more intense and less numerous as the layer is formed; reference is then made to micro-arcs, and then arcs. Depending on the electrical conditions chosen, the electrolyte concentration, the nature of the substrate and the treatment time, the layer thicknesses obtained can vary from 2 to 250 µm. To achieve this, a current density between 20 and 60 A/dm$^2$ is applied at a frequency between 100 and 1,000 Hz for a treatment duration greater than 20 minutes, preferably for a duration between 30 minutes and 90 minutes.

The essential characteristic of micro-arc oxidation therefore resides in the presence of electric discharges resulting in very high local temperatures (approximately 2.104 K) and pressures (102 MPa). These temperature increases thus promote the formation of crystallized phases. In addition, the oxidation mechanisms are very complex and lead to the formation of crystallized oxide films subdivided into two sub-layers: a very porous surface layer and a dense inner layer.

This technique makes it possible to create a coating with a particular structure and physicochemical properties through the formation of oxide layers composed of constituent elements of the aluminum alloy and the incorporation into the oxide layer of species such as the sodium salt(s) contained in the electrolytic bath, thus allowing the ceramic coating to be formed on the treated aluminum alloy surface portion.

Advantageously, and according to the invention, said step of applying a pulsed bipolar current is carried out at a current density of the order of 40 A/dm$^2$.

Advantageously, and according to the invention, said manufacturing method further comprises a step of sandblasting the surface portion treated with said micro-arc oxidation treatment step.

According to this variant, said step of sandblasting the surface portion treated with said micro-arc oxidation treatment step makes it possible to eliminate the porous surface layer of the coating formed on the treated surface portion with porosities of varying depths. Therefore, it may be beneficial to polish the formed porous layer in order to create a clear and smooth surface. Treating and smoothing said surface portion makes it possible to avoid flow turbulence when the valve is fitted in an air conditioning system duct. Thus, the passage of the air flow is promoted and improved when said surface portion of the valve is treated with a sandblasting step.

Advantageously, and according to the invention, said manufacturing method further comprises, before said micro-arc oxidation treatment step, a step of degreasing the aluminum alloy surface portion.

Said step of degreasing the aluminum alloy surface portion is carried out prior to the micro-arc oxidation treatment step, in order to remove any impurities that may have been deposited on said surface portion to be treated. Degreasing can be carried out manually using acetone, which is applied directly to said surface portion prior to the micro-arc oxidation treatment.

According to another variant, the degreasing can be carried out using solvents (halogenated or non-halogenated organic solutions, alkaline aqueous solutions). A chemical stripping step (acidic aqueous solution) can also be used.

Advantageously, and according to the invention, said manufacturing method further comprises a step of thermal spraying over the surface portion treated with said micro-arc oxidation treatment step.

According to the invention, the thermal spraying step enables the production of a ceramic coating with good thermal properties, directly on the surface portion treated with the micro-arc oxidation treatment step. The coating formed as a result of the micro-arc oxidation treatment step is used as a protective layer during thermal spraying, and also as a bonding sub-layer for the layer produced by thermal spraying.

Thermal spraying involves using a source of thermal and kinetic energy to melt a material and accelerate it to a substrate. Upon impact, the molten particles will deform, spread out and cool to form lamellae. The stacking of the lamellae formed in this way then constructs the layer produced by thermal spraying.

Thermal spraying makes it possible to obtain a ceramic coating by using, for example, zirconia stabilized with yttrin ($ZrO_2$—$Y_2O_3$) or even perovskites ($BaZrO_3$, $CaZrO_3$, $SrZrO_3$, $LaAlO_3$, etc.). These oxides present real interest in terms of fire protection. However, these oxides cannot be formed during a treatment process using micro-arc oxidation and cannot be deposited by direct spraying onto an aluminum alloy. In fact, the adhesion of the layers produced by thermal spraying is mainly of mechanical origin and depends, to a very large extent, on the roughness of the surface of the substrate. To promote this type of adhesion, a preliminary preparation step is often necessary. Generally, it is also necessary to develop a bonding layer on the surface of the metal alloy to be treated, which provides protection for the substrate from the temperatures reached during the spraying (around 2,000° C.) and which ensures mechanical and chemical compatibility between the deposited ceramic layer and the metal alloy.

Therefore, the presence of a coating obtained following the micro-arc oxidation treatment step allows for thermal spraying to be implemented on a coating with sufficient porosity and roughness so as to enable the good mechanical adhesion of the sprayed coating. In addition, given that it is an assembly of layers of the same type, ceramic, chemical compatibility is also ensured.

Advantageously, and according to the invention, the thermal spraying is chosen from amongst atmospheric plasma spraying, better known as Air Plasma Spraying (APS), suspension plasma spraying (SPS), and Solution Precursor Plasma Spraying (SPPS).

Advantageously, and according to the invention, said manufacturing method further comprises a step of applying a sol-gel coating onto the surface portion treated with said micro-arc oxidation treatment step.

According to the invention, the step of applying a sol-gel coating to the surface portion treated with the micro-arc oxidation treatment step makes it possible to improve the thermal barrier role of the coating obtained by micro-arc oxidation.

The coating formed as a result of the micro-arc oxidation treatment step is used as a bonding sub-layer of the sol-gel coating.

One of the shaping methods known to persons skilled in the art consists firstly in producing a gel containing powders (for example yttriated zirconia, YSZ) obtained by hydrolysis and condensation. Once this gel has been supercritically dried, a nanometric powder aerogel is obtained. The powder is then dispersed in suspension and the metal substrate is deposited by dipping coating before annealing. The coating formed following the micro-arc oxidation treatment step allows for good adhesion of the sol-gel deposit, as well as the protection of the aluminum alloy during the step of applying a sol-gel coating during which annealing is carried out at temperatures of the order of 1,000° C.

The invention also relates to a part of an air conditioning system for an air or rail transport vehicle comprising at least one aluminum alloy surface portion, characterized in that said part is obtained via a manufacturing method according to the invention to make it fire-resistant.

In particular, the surface portion of the part of the air conditioning system is treated with micro-arc oxidation so as to obtain a ceramic coating on said fire-resistant surface portion.

According to the invention, said part comprises a surface portion that has undergone a micro-arc oxidation treatment in order to make it fire-resistant. Said part, and in particular the surface portion treated with micro-arc oxidation, thus has a ceramic coating with thermal resistance, and fire-resistance in particular.

In addition, the part according to the invention has very good corrosion-, erosion- and wear-resistance, as well as good resistance to fire.

The part according to the invention forms a thermal barrier against fire. The part according to the invention also enables savings in regard to weight, cost and assembly time.

Advantageously, and according to the invention, said treatment of the surface portion is configured to allow the part to be resistant to temperatures equal to or greater than 1,000° C.

According to the invention, said part is fire-resistant and demonstrates resistance to high temperatures that may be encountered in an air conditioning system of an air or rail transport vehicle.

Therefore, it makes it possible to withstand temperature values with variable or even extreme deviations.

Advantageously, and according to the invention, the part is a valve comprising an aluminum alloy butterfly valve forming said surface portion treated with micro-arc oxidation.

According to the invention, said valve is an air flow control valve, fitted into an air conditioning system for an air or rail transport vehicle. The control valve is butterfly style, the butterfly of which is made of aluminum alloy treated with the micro-arc method to form a fire-resistant coating.

The invention also relates to an air conditioning system for an air or rail transport vehicle comprising at least one part according to the invention.

According to the invention, said air conditioning system for an air or rail transport vehicle therefore has a lower mass than an air conditioning system incorporating parts made with stainless steel. Thus, by using aluminum alloy to manufacture parts, the weight of the air conditioning system can be reduced.

The invention also relates to an air or rail transport vehicle comprising at least one propulsion engine, a cabin, and at least one air conditioning system for said cabin according to the invention.

The advantages of such a manufacturing method according to the invention apply mutatis mutandis to said part obtained via the method according to the invention, to said air conditioning system according to the invention, and to said air or rail transport vehicle according to invention.

The invention also relates to a method for manufacturing a fire-resistant part, a part of an air conditioning system, an air conditioning system of an air or rail transport vehicle, an air or rail transport vehicle, characterized in combination by all or part of the features mentioned above or below.

LIST OF FIGURES

Further aims, features and advantages of the invention can be found in the following description, which is provided solely as a non-limiting example, and which refers to the accompanying figures, in which:

FIG. 1 is a schematic view of a manufacturing method for a fire-resistant valve according to an embodiment of the invention;

FIG. 2 shows a graph of the evolution of the temperature of the rear face of a butterfly valve which has undergone the manufacturing method by micro-arc oxidation as a function of the exposure time to a flame of 1,100° C.; and FIG. 3 is a schematic perspective view of an aircraft, in accordance with an embodiment according to the invention.

DETAILED DESCRIPTION OF AN EMBODIMENT OF THE INVENTION

The method described below enables the manufacture of a fire-resistant air flow control valve (butterfly style) for an air conditioning system. Thus, the aluminum alloy surface portion corresponds to the obturator element of the butterfly valve, that is to say, the butterfly itself.

Of course, the method according to the invention can also be applied to any other type of valve, in particular ball valves, flap valves, as well as to any type of parts with a surface portion made of aluminum alloy such as an actuator body or a regulator body.

The manufacturing method as shown in FIG. 1 comprises the following steps:
- a step 10, obtaining a butterfly valve comprising a butterfly made of aluminum alloy,
- a step 11, degreasing the aluminum alloy butterfly,
- a step 20, treating the butterfly valve with a micro-arc oxidation treatment comprising a step 21 of immersing the butterfly valve and a step 22 of applying a pulsed bipolar electric current to obtain the formation of the ceramic coating on said butterfly,
- a step 23, rinsing and drying the butterfly valve, and
- a step 30, sandblasting the butterfly valve.

According to this embodiment, step 10 of obtaining the butterfly valve to be treated consists in having a butterfly valve, the butterfly of which is made of aluminum alloy and forms the surface portion to be treated. In this case, the butterfly is isolated from the valve body in order to be treated on its own, and it is then reassembled onto the valve body after treatment.

Step 11 of degreasing the butterfly of the butterfly valve consists in removing the impurities that may be deposited over the aluminum alloy butterfly. Degreasing is carried out manually using acetone applied directly to the butterfly.

Step 20 of treating the butterfly by micro-arc oxidation comprises a step 21 of immersion in an electrolytic bath and a step 22 of applying a pulsed bipolar current to form the ceramic coating on the butterfly of the valve.

Immersion step 21 consists in putting the butterfly valve, only the aluminum alloy butterfly of which is in direct contact with an electrolyte, into an aqueous solution comprising sodium silicates ($Na_2SiO_3$) and potassium hydroxide (KOH).

Step 22 consists in applying a pulsed bipolar current to the electrodes using a specific generator applying a current density of the order of 40 $A/dm^2$ for a period of between 30 and 90 minutes. At the end of step 22, a ceramic coating is formed on the butterfly.

The rinsing and drying step 23 is carried out using distilled water, making it possible to rinse the treated portion and to eliminate the electrolyte in which the butterfly valve was immersed. The butterfly valve is then dried with compressed air.

The butterfly undergoes step 30 of surface sandblasting of the coating in order to remove any surface defects in the coating caused by the micro-arcs. This step allows for a coating to be obtained on the butterfly that is smooth and free of imperfections, optimizing the flow passage.

According to this embodiment, the ceramic coating has a thickness of between 80 and 150 micrometers.

Tests were carried out on coated butterflies to demonstrate the effectiveness of such a treatment with micro-arc oxidation, in regard to fire resistance.

FIG. 2 shows a graph illustrating the change in the temperature of the rear face of a butterfly, in line with the time, when the front face of said butterfly is subjected to a flame of 1,100° C. for 15 minutes, according to the ISO2685 standard.

Two aluminum alloy butterflies were treated using the method according to FIG. 1. The first butterfly has a 100 μm thick coating; it corresponds to the high curve "MAO 100 μm" on the graph. The second butterfly has a 120 μm thick coating; it corresponds to the low curve "MAO 120 μm" on the graph.

Each butterfly is subjected to the flame of an ISO 2685 kerosene burner for 15 minutes. The face exposed to the flame is referred to as the front face, and the unexposed face is referred to as the rear face. The burner is positioned at a distance of 10 cm from the butterfly and the burner flame is in direct contact with the surface of the front face of the butterfly. A surface thermocouple (type K, class 1) is positioned on the rear face in order to measure the temperature of the rear face throughout the flame test. The flame temperature was calibrated before the test and was recorded at 1,100° C.+/−100° C.

The graph shows the change in the temperature of the rear face during the flame test. It is noted that the coating allows the temperature perceived by the aluminum alloy to be reduced by about 500° C. for the thickest coating. When the flame is applied to the front face of the "MAO 120 μm" and "MAO 100 μm" butterflies, the rear face of each butterfly heats up to a value of approximately 600° C. and 700° C., respectively. The temperature measured on the rear face remains generally constant when a flame at 1,100° C. is maintained at the front face of each butterfly for 15 minutes.

This graph shows the fire- and flame-resistance of an aluminum alloy butterfly that has been treated according to the method shown in FIG. 1 with micro-arc oxidation.

The ceramic coating produced by the micro-arc oxidation method shown in FIG. 1 makes it possible to obtain butterfly valves coated with a fire-resistant aluminum alloy.

FIG. 3 illustrates an air transport vehicle 8 that comprises a propulsion engine 7, a cabin and at least one air conditioning system 9 for said cabin that comprises a butterfly valve obtained according to the method shown in FIG. 1. Thus, the butterfly valve can be fitted in ducts of the air conditioning system on-board an aircraft, in order to regulate the air flows, while being fire-resistant. If a fire breaks out in the engine environment, the control butterfly valve fitted in the ducts of the air conditioning system for an aircraft makes it possible to isolate the fire and prevent it from spreading through the air circulation ducts.

The invention claimed is:

1. Method for manufacturing a fire-resistant part of an air conditioning system for an air or rail transport vehicle, the method comprising at least the following steps:
    a step of obtaining a part comprising at least one aluminum alloy surface portion,
    a step of treating said aluminum alloy surface portion with micro-arc oxidation in order to obtain a ceramic coating on said surface portion,
    a step of sandblasting the surface portion treated with said micro-arc oxidation treatment step,
        wherein said step of treating said aluminum alloy surface portion comprises at least the following steps:
        a step of immersing said aluminum alloy surface portion in an electrolytic bath comprising an aqueous solution of sodium silicate,
        a step of applying a pulsed bipolar current at a current density passing through said aluminum alloy surface portion of between 20 A/dm$^2$ and 60 A/dm$^2$ for a period of between 30 and 90 minutes, such that after said step of sandblasting said ceramic coating has a thickness of 100 to 150 μm providing fire-resistance to said part such that the part to which a flame is applied at 1,200° C. for a period of between 5 and 15 minutes, shows no sign of deformation or deterioration after exposure to the flame.

2. The method for manufacturing a part according to claim 1, wherein said step of applying a pulsed bipolar current is carried out at a current density of the order of 40 A/dm2.

3. The method for manufacturing a part according to claim 2, further comprising a step following the sandblasting of thermal spraying on the surface portion treated with said micro-arc oxidation treatment step.

4. The method for manufacturing a part according to claim 2, further comprising a step following the sandblasting of applying a sol-gel coating onto the surface portion treated with said micro-arc oxidation treatment step.

5. The method for manufacturing a part according to claim 1, further comprising a step following the sandblasting of thermal spraying on the surface portion treated with said micro-arc oxidation treatment step.

6. The method for manufacturing a part according to claim 5, wherein the thermal spraying is chosen from amongst atmospheric plasma spraying suspension plasma spraying and solution precursor plasma spraying.

7. The method for manufacturing a part according to claim 6, further comprising a step following the sandblasting of applying a sol-gel coating onto the surface portion treated with said micro-arc oxidation treatment step.

8. The method for manufacturing a part according to claim 5, further comprising a step following the sandblasting of applying a sol-gel coating onto the surface portion treated with said micro-arc oxidation treatment step.

9. The method for manufacturing a part according to claim 1, further comprising a step following the sandblasting of applying a sol-gel coating onto the surface portion treated with said micro-arc oxidation treatment step.

* * * * *